United States Patent
Ochmanski et al.

(10) Patent No.: US 9,621,355 B1
(45) Date of Patent: Apr. 11, 2017

(54) SECURELY AUTHORIZING CLIENT APPLICATIONS ON DEVICES TO HOSTED SERVICES

(71) Applicant: Cisco Technology, Inc., San Jose, CA (US)

(72) Inventors: Steven R. Ochmanski, Raleigh, NC (US); David C. White, Jr., Durham, NC (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/872,337

(22) Filed: Oct. 1, 2015

(51) Int. Cl.
*H04L 29/06* (2006.01)
*H04L 9/32* (2006.01)
*H04L 29/08* (2006.01)

(52) U.S. Cl.
CPC ............ *H04L 9/3247* (2013.01); *H04L 63/06* (2013.01); *H04L 63/083* (2013.01); *H04L 63/102* (2013.01); *H04L 67/02* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 7,565,554 B2 * | 7/2009 | Joosten | ................... | G06F 21/33 380/278 |
| 8,117,452 B2 | 2/2012 | Bell et al. | | |
| 8,832,447 B2 * | 9/2014 | Neumann | ............. | H04L 9/3247 713/156 |
| 8,868,915 B2 | 10/2014 | Counterman | | |
| 2005/0246539 A1 * | 11/2005 | Cofta | .................... | H04L 9/3234 713/176 |
| 2012/0144202 A1 * | 6/2012 | Counterman | ......... | G06F 21/335 713/176 |
| 2015/0128264 A1 | 5/2015 | White, Jr. et al. | | |

OTHER PUBLICATIONS

D. Simon et al., "The EAP-TLS Authentication Protocol", Network Working Group, RFC 5216, Mar. 2008, 30 pages.
D. Hardt, Ed., "The OAuth 2.0 Authorization Framework", Internet Engineering Task Force (IETF), Oct. 2012, RFC6749, 76 pages.
"Secure Device Identity" IEEE Standard for Local and metropolitan area networks, IEEE Std 802.1AR 2009, Dec. 22, 2009, 77 pages.

* cited by examiner

*Primary Examiner* — Minh Dinh
(74) *Attorney, Agent, or Firm* — Edell, Shapiro & Finnan, LLC

(57) ABSTRACT

A client application of a device queries/interrogates a secure device identity module of the device to obtain a device identifier of the device and a signed string generated by the security device identity module using a private key unique to the device. The client application of the device sends to an authorization server a request containing the device identifier and the signed string. Depending on an authentication result obtained for the device based on the device identity, the authorization server sends to the device an access token that enables the client application to access a resource.

21 Claims, 5 Drawing Sheets

SECURELY AUTHORIZING CLIENT APPLICATIONS ON DEVICES TO HOSTED SERVICES

TECHNICAL FIELD

The present disclosure relates to authorization of devices and applications.

BACKGROUND

When a device (e.g. a router, switch, access point, or any device) attempts to access an Application Programming Interface (API) resource hosted by an enterprise, it is often required that a human encode and save their login credentials (e.g., user identifier and user password) directly into the configuration of the device. The device then impersonates that human's user account when accessing the enterprise API resources. This is known as a password anti-pattern.

Saving a user's credentials on a device has many disadvantages. The credentials may not be secure at rest in the configurations. The credentials may or may not be secure in transport. Such is the case when Trivial File Transfer Protocol (TFTP) is used, or when the credentials are stored off-box, e.g., in a plain text file. The device could get stolen (while still configured with that user's credentials). The user's password could change (by policy or as a reaction to a password loss), which would result in the need to change the configurations on all devices that have stored that user's credentials. The user could leave the role or group or company. In any event, the device is not identifying itself; rather the device is posing/impersonating the saved user's identity.

DESCRIPTION OF EXAMPLE EMBODIMENTS

Overview

Figure 1:
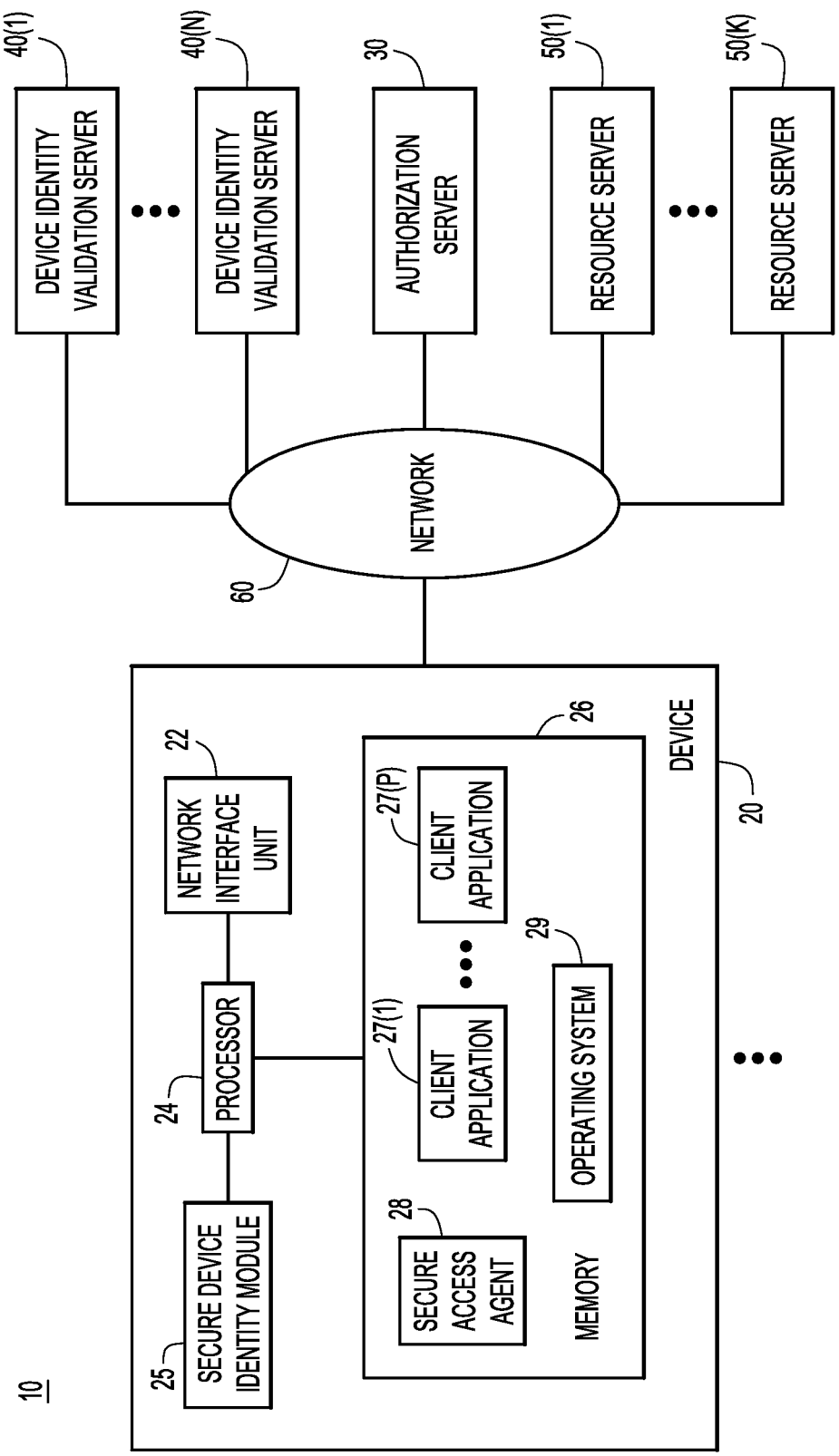
FIG. 1 is a block diagram of a system in which a device identity is used to authorize access of a client application to a resource, according to an example embodiment.

In one embodiment, a client application of a device queries/interrogates a secure device identity module of the device to obtain a device identifier of the device and a signed string generated by the security device identity module using a private key unique to the device. The client application of the device sends to an authorization server a request containing the device identifier and the signed string. Depending on an authentication result obtained for the device based on the device identity, the authorization server sends to the device an access token that enables the client application to access a resource.

Example Embodiments

Most devices today do not identify themselves. Instead they impersonate a human user when the device calls into an Application Programming Interface (API) resource. By a human entering his/her credentials into a device, the device can call an API resource with user approval.

When a device is not identifying itself but instead is posing as a saved user's identity, this is known in the authorization technology field as that a password anti-pattern. This occurs when a human saves his/her password directly into a client application. From a security perspective, it is considered bad practice.

If a human leaves a company and his/her credentials were in a device, then that device may either (1) no longer be functional because those credentials could be invalid, or (2) if the credentials are still valid (or until they are made invalid), that device could do undesired things with the human user's credentials.

A device should have its own unique identity, not shared across devices. In other words, a device should not impersonate a human. The device should identify itself.

In actuality, a given device could have two identities: one for a client application running on the device, and one for the device itself. The same application could run on hundreds of devices. The device identifier should be unique and something that can be proven (authenticated). By contrast, when a user enters his/her human identifier, it is not identifying a particular device.

Most modern web APIs use oAuth 2.0 (v2), as specified in RFC 6749 of the Internet Engineering Task Force (IETF). oAuth v2 has several primary grant types:

2-legged Client Credential Grant. This is useful for machine-to-machine (M2M) but only identifies the client application to the back-end resource (API) not the human identity. This does not help with device identity. Multiple devices could use the same client application and therefore have the same client identifier (client_id).

3-legged Authorization Code Grant (for trusted environment clients). This identifies both the client application and the human (resource owner) to the back-end resource (API).

3-legged Implicit Grant (for untrusted environment clients). This identifies both the client application and the human (resource owner) to the back-end resource (API).

3-legged Resource Owner Password Grant (for legacy trusted application).

The 3-legged Authorization Code Grant and Implicit Grant identify both the client application and the human's identity. These grant types are sufficient for most user interface and non-specific batch program type of client applications, but they lack a dimension when a device may have multiple client applications on it and a need exists to identify the "device itself" and the client application for determining entitlement of access to a resource (API).

Presented herein are techniques that modify the original Resource Owner (password grant type) of oAuth v2, and in lieu of human login credentials, information in the body of the Hypertext Transfer Protocol Secure (HTTPS) POST request is used as a mechanism to identify the device (and its authenticity) as well as to identify a client application running on the device. This information is contained within a token generated by the authorization server and transmitted securely to the device in the HTTP POST response. The client application uses this token (called a "bearer access-_token") for later resource API calls in the client application (running on the device).

In one embodiment, the device identity is derived from the IEEE 802.1AR (also known as IDevID or LDevID) standard. IEEE 802.1AR provides for a device identifier and a digitally signed block of text (signed string) from the device and uses that in a device authentication sub-flow.

"IDevID" is a term coined by IEEE 802.1AR to refer to a digital certificate representing the device rather than a user. The terms Initial Device IDentity (IDevID) and Local Device IDentity (LDevID) used herein may be interchangeable. Both are specific extensions defined by IEEE 802.1AR for the term Device Identifier (DevID).

Reference is now made to FIG. 1. FIG. 1 illustrates a system 10 that includes a device 20, an authorization server 30, a plurality of device identity validation servers 40(1)-40(N), and a plurality of resource servers 50(1)-50(K). The device 20 communicates with the authorization server 30 and with the resource servers 50(1)-50(K) via a network 60. The network 60 may include wired and wireless local area networks and wired and wireless wide area networks. There may be multiple devices in a given system but for simplicity only a single device 20 is shown.

The device 20 may be any type of device that has network connectivity and processing capability. Examples of the device 20 include networking switches, routers, gateways, user devices such as desktop computers, laptop computers, tablets, and SmartPhones. The device 20 may be any type of device now known or hereinafter developed, and which has network connectivity. In one example, the device 20 includes a network interface unit (e.g., network interface card) 22 to enable wired and/or wireless network communications, a processor 24 (or multiple processors), a security device identity module 25, and memory 26. The memory 26 stores executable instructions for, among other things, client applications 27(1)-27(P), a secure access agent 28 and an operating system 29.

The processor 24 may be a microprocessor or microcontroller. The secure device identity module 25 maybe a dedicated hardware component (e.g., application specific integrated circuit) that performs a certificate mechanism based on a device identity established by the device manufacturer at build time of the device. In one example, the certificate mechanism maybe based on the IEEE 802.1AR standard that provides asymmetric credentials, meaning that there is a part that is available to identify the device anywhere (a digital public key) but another part that is only available to the device itself (a digital private key). Thus, the IEEE 802.1AR standard uses public key infrastructure (PKI) involving a public/private key pair. The private key in the IEEE 802.1AR mechanism is unique to each device. Other types of device credentials could be used. Moreover, the functions of the secure device identity module 25 may be implemented partially in hardware and partially in software (e.g., in the operating system 29), completely in hardware or completely in software (e.g., in the operating system 29).

In the example in which the secure device identity module 25 is compliant with the IEEE 802.1AR standard, it may be referred to as a DevID service interface module and it implements a DevID Service Interface. The DevID Service Interface supports several operations including: enumeration of the DevID public keys, enumeration of the DevID credentials (the device identifier referred to herein), enumeration of DevID credential chain, signing, enabling/disabling of a DevID credential and enabling/disabling of a DevID key. More generally, the device identity may be referred to as a device identity credential, and it could be a platform manufacturer-installed (chip manufacturer, distributor software manufacturer/publisher, or device manufacturer) device identity credential, or a customer locally installed device identity credential. The DevID Service Interface may be more broadly referred to as a programmatic interface with interacting with a system that holds one or more device identities.

The client applications 27(1)-27(P) could perform any type of functionality in the device 20. The secure access agent 28 is a software process running on the device 20 to enable authorization and authentication of the device. In one example, the secure access agent 28 is compliant with the OAuth v2 (2.0) standard. As explained above, OAuth is an open standard for authorization, and provides client applications a 'secure delegated access' to server resources on behalf of a resource owner. It specifies a process for resource owners to authorize third-party access to their server resources without sharing their credentials. The functions of the secure access agent 28 could be included within the functions of the client applications 27(1)-27(P) or within the functions of the operating system 29.

The memory 26 may include read only memory (ROM), random access memory (RAM), magnetic disk storage media devices, optical storage media devices, flash memory devices, electrical, optical, or other physical/tangible memory storage devices. Thus, in general, the memory 26 may comprise one or more tangible (non-transitory) computer readable storage media (e.g., a memory device) encoded with software comprising computer executable instructions and when the software is executed (by the processor 24) it is operable to perform the operations described herein.

Still referring to FIG. 1, the authorization server 30 is a server that also operates in compliance with the OAuth v2.0 standard. The authorization server 30 receives from the device 20 a request for access to a resource, e.g., one of the resource servers 50(1)-50(K). Each of resource servers 50(1)-50(K) may be considered an API endpoint, that is, an externally hosted API resource for performing a task at the request of a client application running on the device 20. In order to determine the scope of permissions available for a given request, the authorization server 30 will seek authentication of the device 20 (using a device identifier, such as an IDevID/LDevID embedded in the device usually at manufacture). To do this, the authorization server 30 will communicate with a particular one of the device identity validation servers 40(1)-40(N). Each device identity validation server 40(1)-40(N) stores entries in a database/certificate store for device identifiers associated with devices of a particular type or from a given manufacturer. In addition, each device identity validation server 40(1)-40(N) has the appropriate public key for each public/private key pair associated with a device in its database/certificate store. As explained further hereinafter, this will allow the appropriate device identity validation server 40(1)-40(N) to validate the device identifier and cipher text (signed string) contained in an authorization request that device 20 sends to the authorization server 30.

The original Resource Owner Password grant flow of OAuth 2.0 (HTTPS POST) has a body of:
grant_type=pas sword & username=<username> & password=<the user's password>

According to the embodiments presented herein, a Device Resource Owner Password Grant flow (HTTPS POST) is:
grant_type=password & username=<IDevID.SubectSerialNumber@DeviceDomain> & password=<a signed block or string of text (signed by the private key of the device)>
where:
grant_type: This is the same as the human resource owner flow.
username: This is a unique identifier of the leaf certificate for which there is a public key to check the signed string of text, within the DeviceDomain. DeviceDomain is a programmable name on the authorization server 30 that the authorization server 30 uses to bifurcate and broker to the appropriate device identity validation server in the backend. This provides a mechanism to scale in the Internet of Things (IoT) world, by breaking up domains into manageable blocks of devices. DeviceDomain is an optional component.

password: A block of text signed by the IEEE 802.1AR mechanism within the device using the private key (of the IDevID) on that device. The password consists of at least the IDevID Subject.SerialNumber (usually hardware product identifier (PID) and SerialNumber), signed by the private key maintained by the device. Optionally, other fields may be included, such as a nonce for protection against a replay attack. The nonce comes from the authorization server when the request for authentication is issued, and may be included in the block of text before the signing operation is performed. When a nonce is used as an anti-replay tool, the device that is verifying the validity of the credential is the source of the nonce. That way, the verifier, in this case the authorization server, can examine the nonce to determine that it is the same nonce that it sent to the device, thereby ensuring that the response is not a replay of a previously successful response.

Figure 2:
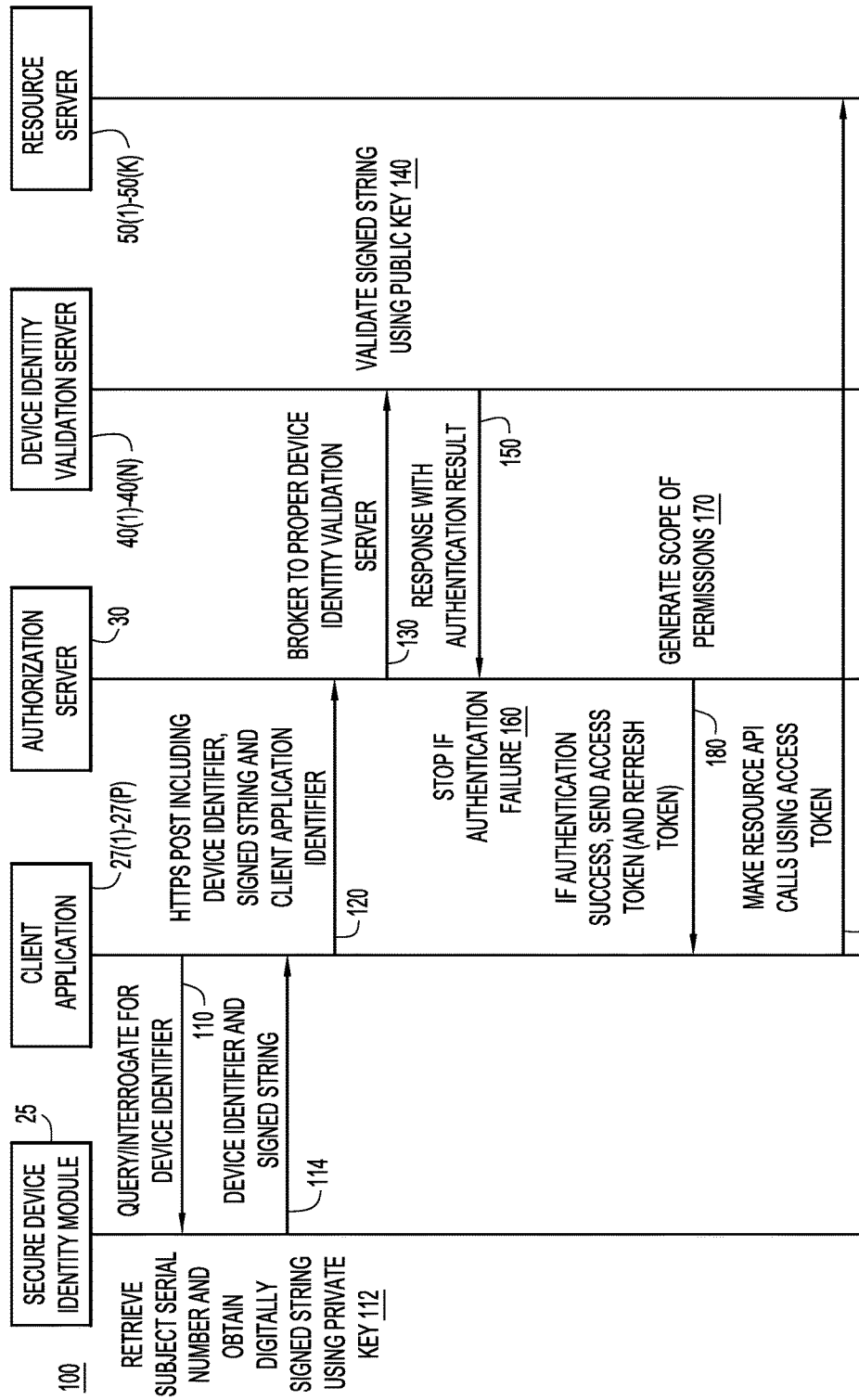
FIG. 2 is a sequence diagram depicting the transactional flow for authorization of the client application and device, according to an example embodiment.

Reference is now made to FIG. 2. FIG. 2 illustrates a sequence/transactional diagram for the overall authentication/authorization flow 100 according to an example embodiment. FIG. 2 shows the interaction among the security device identity module 25, any arbitrary one of the client applications 27(1)-27(P), the authorization server 30, any one of the device identity validation servers 40(1)-40(N) and any one of the resource servers 50(1)-50(K). It is to be understood that the security device identity module 25 and the client application 27(1)-27(P) involved in a given transactional flow are within the same device, as depicted in FIG. 1.

The flow begins at operation 110. Instead of a human entering his/her user name and password, when a client application running on a device seeks access to an API resource, the client application queries/interrogates the secure device identity module 25 for the device identifier. In one example, the secure device identity module 25 implements the IEEE 802.1AR/IDevID mechanism, and at 112, the IDevID Subject.SerialNumber is retrieved and (at least) that Subject.SerialNumber (string) is sent to be digitally signed via the service interface of IEEE 802.1AR for that block of text, using the private key maintained by the secure device identity module 25.

As explained above, the IEEE 802.1AR standard allows for the creation of a digital signature based on a private key so that the client application will use the services of the identity service in the device to prove that it is the device. This is a key-based solution and not a password. The Subject.SerialNumber (text string) and optionally other fields are run through the digital signing mechanism to produce signed text that could only be done by the secure device identity module 25 using the private key within it (in lieu of a password). The client application needs to be running on the device because it needs to interrogate the IEEE 802.1AR/IDevID mechanism on the device.

At 114, the secure device identity module 25 responds to the client application with both the device identifier (the IDevID Subject.SerialNumber) and the cypher text (the cryptographically signed string).

Next, at 120, the client application sends to the authorization server a request including the device identifier, signed string and a client application identifier (the client application identifier may be optional). For example, the client application transmits an HTTPS POST (within a Secure Socket Layer (SSL) tunnel) to the authorization server (OAuth 2.0 token endpoint) but with a POST payload as follows:

grant_type=password & username=<IDevID.SubectSerialNumber@DeviceDomain> & password=<A signed block of text (signed by the device's private key)>.

Thus, the user identifier of a standard OAuth 2.0 flow is swapped out for the device identifier (e.g., IDevID/LDevID) and a signed block of text is used instead of a password. As described above, as an optional variation, a nonce may be included (in the block of text before digitally signing) in the HTTPS POST payload for replay protection so that the information that is passed in step 120 cannot be captured and replayed by a rogue device that is attempting to prove that it is an authentic device.

Also, at 120, the HTTPS POST has a "Basic Authentication" header (including the client_id/client_secret pair) as is the case for a normal resource owner flow. As a result, the HTTPS POST includes a client application identifier (client_id) that is unique to a given client application as well. Thus, there may be two identities (one for the device and one for the client application) that are combined into one access token request.

At 130, the authorization server 30 uses the DeviceDomain to bifurcate and broker to the proper backend identity validation server. In other words, the authorization server 30 examines the DeviceDomain contained in the POST payload to identify a particular device identity validation server, of the plurality of device identity validation servers 40(1)-40(N), which will have the public key of the public-key private-key pair for that device. The particular device identity validation server may be the device identity validation server for the manufacturer of the device, or for the enterprise where the device is used. Also, the device identifier may be included in what is sent to the particular device identity validation server because there may be records for thousands of devices at the particular device identity validation server. The device identifier (IDevID Subject.SerialNumber) allows the particular device identity validation server to retrieve the record (the public key) for the particular device.

In some cases, the DeviceDomain may not be included in the request received by the authorization server 30 and thus the authorization server 30 may also serve as the device identity validation server for authenticating the device, or there is only one separate device identity validation server to which the authorization server 30 needs to forward the request. However, when the request includes a DeviceDomain, the authorization server performs the brokering operation by determining a particular device identity validation server (among a plurality of device identity validation servers) based on the DeviceDomain to send the device identifier to the particular device identity validation server.

At 140, the particular device identity validation server uses the public key that it has for the particular device to check the validity of the signed text in the request sent by the client application to the authorization server 30. More specifically, at 140, the particular device identity validation server applies the public key to the signed text (thereby decrypting it) and compares the resulting values with the stated IDevID Subject.SerialNumber. When the particular identity validation server determines that there is a match of the signed text to the results of application of the public key to the device identifier, then the particular identity validation server confirms that the signed text could only have come from a device that had the private key, and in that case, the device is authenticated.

At 150, the particular device identity validation server sends to the authorization server 30 a response with an authentication result (authentication success or failure) indicating whether the device is or is not the device it represents that it is. If the signed text is valid (decrypts from the public-key and the IDevID Subject.SerialNumber within the block matches), then the particular device identity validation server transmits an authentication success notification to the authorization server 30 at 150. If the signed text is invalid (decrypts from the public-key but does not match IDevID Subject.SerialNumber), the particular device identity validation server transmits an authentication failure notification to the authorization server 30 at 150. If the signed text (decrypts from the public-key and matches the IDevID Subject.SerialNumber) but has an expired or revoked status (within the particular device identity validation server) then the particular device identity validation server transmits an authentication failed indication to the authorization server 30 at 150.

If authentication fails, then the authorization server 30 stops any authorization processing, and may send a notification to the client application (not shown in FIG. 2 for simplicity). If authentication succeeds, then the flow goes to step 170.

The authorization server 30 can then give (or not give) certain permissions (scope of permissions, e.g., read access but not write access or which sub-resources are available within a Resource API) to the device in accordance with the authentication pass or fail notification from the device identity validation server.

At 170, when authentication succeeds, the authorization server 30 can authorize the device and the client application according to a scope of permissions that are based on the device identity and the client application identity. Since authentication is based on a unique digital private key that is unique to each device, the resulting authorization scope (if authentication passed) can be far more granular and controllable than if all devices use the same user password. The scope of permissions can be specific to a particular device, and specific to a given client application running on that device. For example, each client application can have different licenses and permissions, allowing for more granular authorization control at the application level as well. Two (or more) different client applications running on the same may get different scopes of permissions by the authorization server.

At 180, the authorization server sends an access token (and optional refresh token) to the client application. An access token is similar to a cookie. The client application needs to fetch the access token first, using the process depicted in steps 110-180. The client application now has a bearer access_token and can make resource (API) calls to the API endpoint (one of the resource servers 50(1)-50(K)) using the bearer access_token. Thus, at 190, when making an API call to a resource, the application includes the access token in a header for that API call. The bearer_access token may include an absolute timer, making it valid for some period of time regardless of whether or not it gets used.

As explained above, at 180, the authorization server 30 makes a reverse look-up on the access token via the resource API call, at the API edge, in order to identify/determine, based on the unique device identity, scope and permissions for that particular (unique) device. For example, an enterprise could leverage this for additional back-end entitlement validation.

Figure 3:
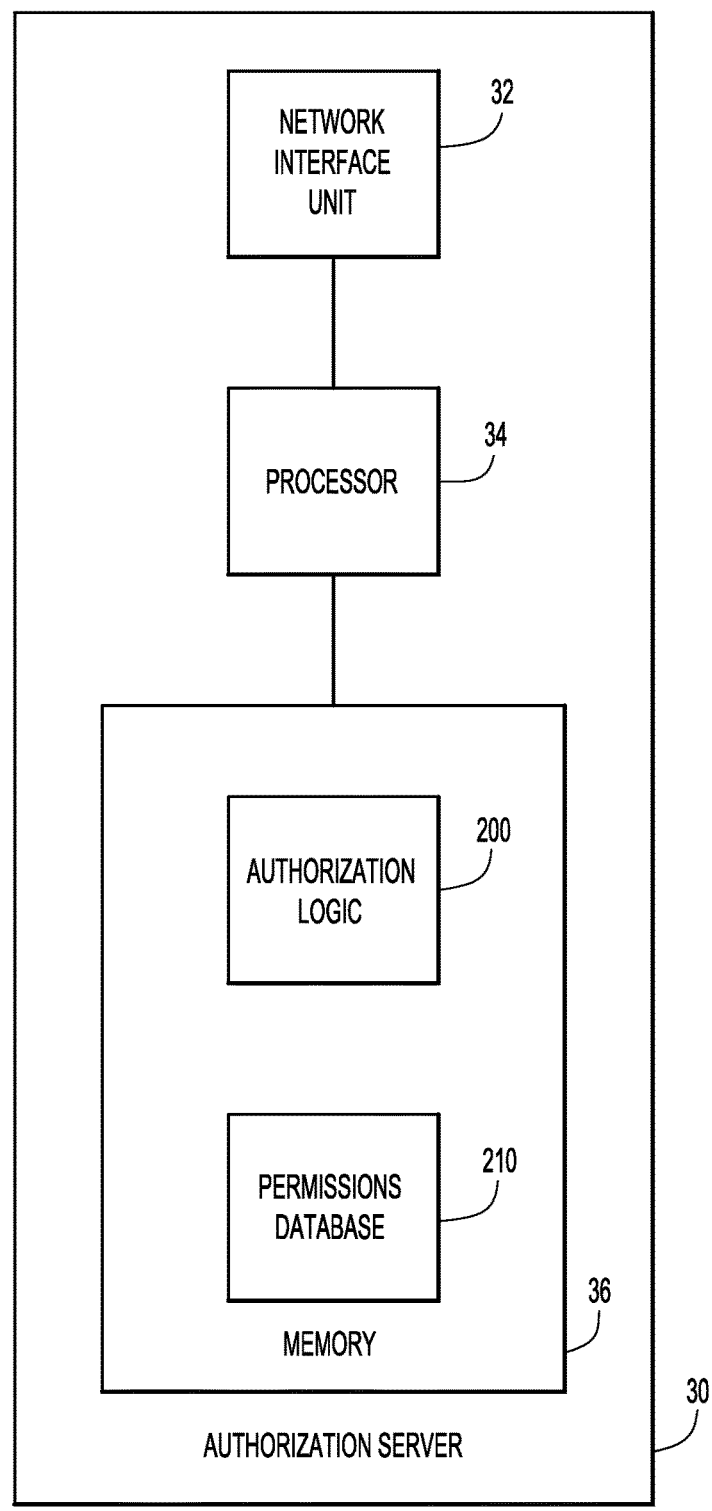
FIG. 3 is a block diagram of an authorization server according to example embodiment.

Reference is now made to FIG. 3 for a block diagram of the authorization server 30 according to an example embodiment. The authorization server 30 includes a network interface unit 32 to enable network communications, a processor 34 (or multiple processors) and memory 36. The memory 36 stores instructions for authorization logic 200 that, when executed by the processor 34, cause the processor to perform the operations of the authorization server 30 as described herein. In addition, the memory 36 stores a permissions database 210. The permissions database 210 contains data indicating permissions according to device identifier and client application identifier per Resource API. The functions of the authorization server could be implemented in a cloud computing/data center computing environment.

Scopes (scope of permissions) are resource API dependent and configured in the permission database 210), and enforced at the API edge when a bearer access_token is presented for a sub-resource within a Resource API call. Some examples could be (but not limited to):

1. Read versus Write versus both Read and Write on a given sub-resource with a Resource API.
2. Which sub-resources are visible (available) to the client application to call. For example, "free" level are permitted access to 3 of 6 sub-resources but a different level ("premium" level) are permitted access to 6 of 6 sub-resources, within a resource API.

Authorization Scopes are described in oAuthv2, RFC 6749.

Figure 4:
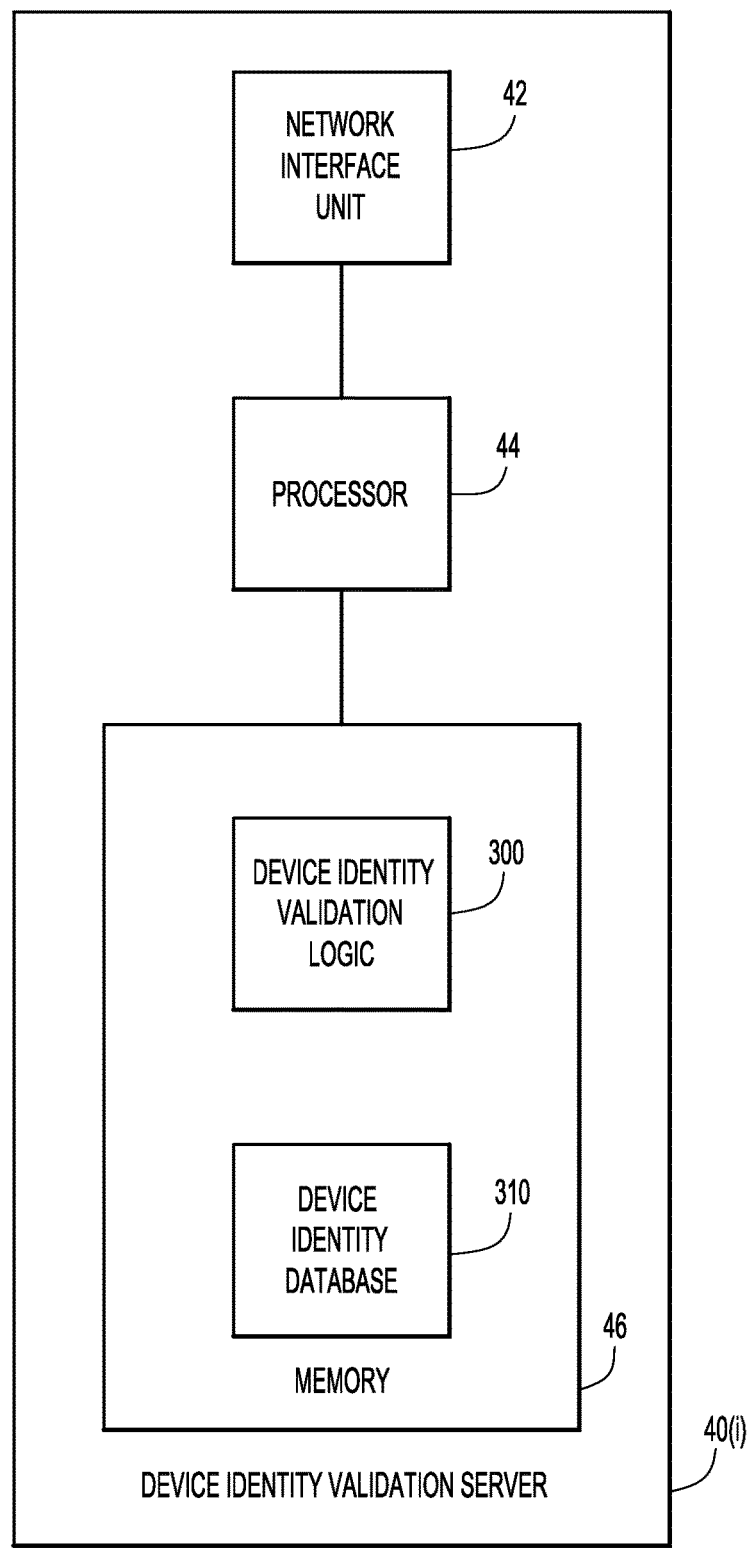
FIG. 4 is a block diagram of a device identity validation server according to an example embodiment.

FIG. 4 illustrates a block diagram of a device identity validation server, generically identified by reference numeral 40(i), and representative of any of the identity validation servers 40(1)-40(N). The device identity validation server includes a network interface unit 42 to enable network communications, a processor 44 (or multiple processors) and memory 46. The memory 46 stores instructions for device identity validation logic 300, that when executed by the processor 44, cause the processor 44 to perform the operations described herein for the device identity validation server. The memory 46 also stores a device identity database (also called a certificate store) 310. The device identity database 310 contains a listing of public keys/certificates for each of the device identifiers (e.g., DevIDs) that have been issued for a given device domain. This information is used by the device identity validation server to validate a password string supplied to the device identity validation server from the authorization server 30 as part of the flow described above in connection with FIG. 2. Therefore, when the device identity validation server receives a request from the authorization server, the device identity validation server checks the device identifier (e.g., Subject.Serial Number) to determine if it has a corresponding entry in the database 310. If so, the device identity validation server retrieves the public key associated with device identifier. The device identity validation server checks the public key to ensure it is still valid (has not expired and has not been revoked) and then uses it to decrypt the message. It then verifies if that decryption was successful. If so, it returns an authentication successful notification to the authorization server.

Figure 5:
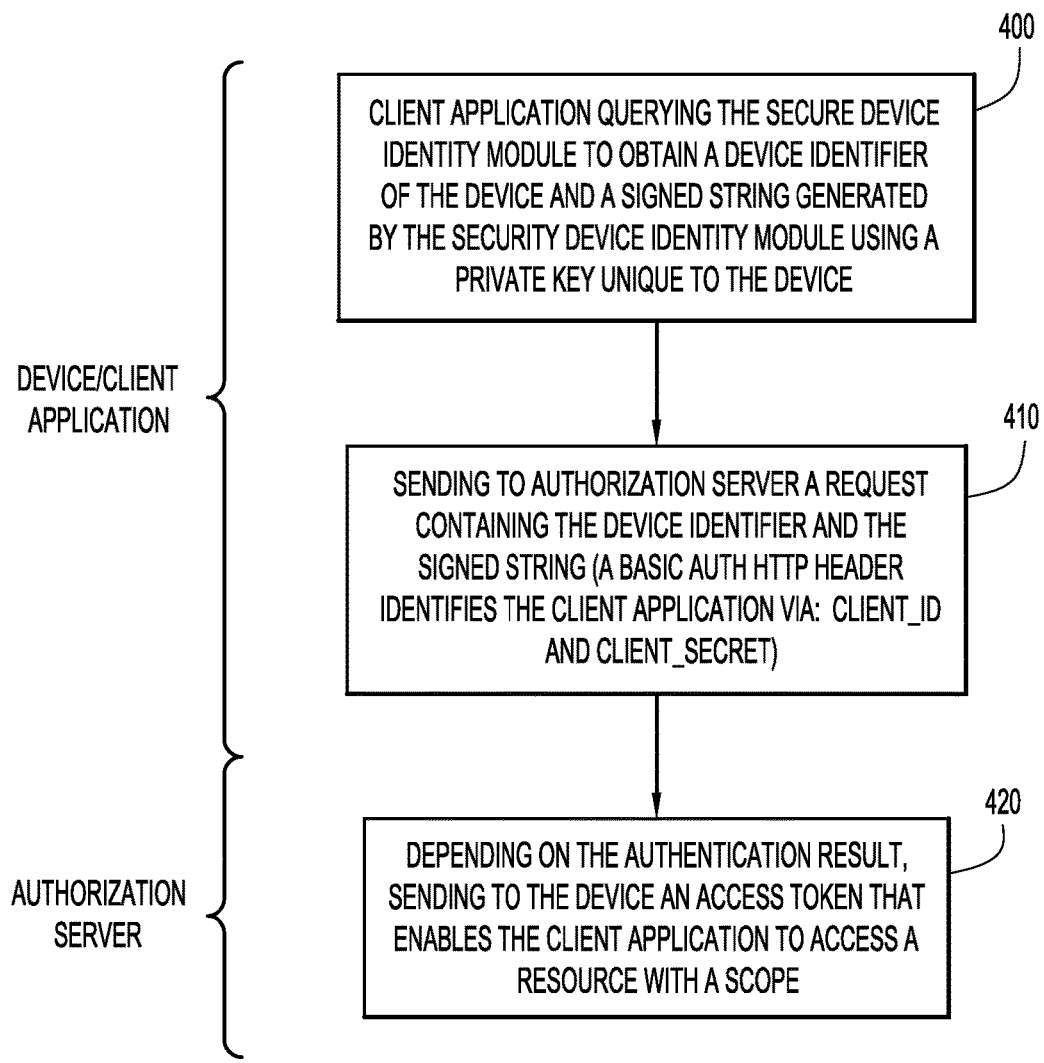
FIG. 5 is a high-level flow chart depicting operations of the device and the authorization server, according to an example embodiment.

FIG. 5 illustrates a flow chart depicting, at a high-level, the operations performed when a device seeks authorization to access a resource and operations performed by the authorization server. Operations 400 and 410 are performed by the client application running in a device. Operation 430 is performed by the authorization server. At 400, the client application queries the secure device identity module to obtain a device identifier of the device and a signed string generated by the security device identity module using a private key unique to the device. At 410, the client application sends to authorization server a request containing the device identifier and the signed string. As explained above, the device identifier may be an IEEE 802.1AR Subject.SerialNumber and the signed string may be generated by cryptographically signing the Subject.SerialNumber with the private key. The request may be a HTTPS POST with a POST payload indicating the device identifier and the signed string. The HTTPS POST may be transmitted in accordance with an authorization procedure compliant with the OAuth 2.0 standard. The HTTPS POST may be a Resource Owner Password Grant flow format grant_type=password & username, where username is based on the Subject.SerialNumber and the device domain, and the password comprises at least the signed string. Moreover, the request may further include the client application identifier. Further still, the request may include device domain information. For example, the header of the HTTPS POST may include the client application identifier as indicated in step 410 of FIG. 5, and in some embodiments, further includes a nonce for protection against a replay attack.

At 420, depending on an authentication result obtained from authenticating the device based on the device identifier, the authorization server sends to the device an access token that enables the client application to access a resource (with a scope). The authorization server may further determine a scope of authorization permissions based on the device identifier and a client application identifier contained in the request, to generate the access token based on the scope of authorization permissions. Authentication of the device, based on the device identifier, may be performed by the authorization server. For example, as described above, when there is no device domain in the request sent by the client application to the authorization server, then the authorization server can itself perform the functions of the device identity validation server to authenticate the device as described above in connection with FIGS. 3 and 4. In that scenario, there is only one default device validation server and the authentication and authorization functions may be co-located at the same entity (the authorization server). In another scenario, when the request includes a device domain, the authorization server determines a particular device identity validation server among a plurality of device identity validation servers based on the device domain. The authorization server sends to the particular device identity validation server the device identifier and the signed string to enable the particular device identity validation server to validate the signed string using a public key based on the device identifier, to generate an authentication result. The authorization server receives from the particular device identity validation server a response that includes the authentication result.

There are numerous use cases for these techniques. In one example, a device may need to call a central API for data for itself, such as, for example, automation of network management task, software/firmware/patches, automation of debugging or analysis in a backend resource, etc., for purposes of troubleshooting the device itself. The device could be validated to determine if it is under an active support contract, the conditions of the contract, etc.

In another example, a "distributed/fog computing" device in which a client application running within the device may need to send/receive some data to a centralized API for that client application's normal operation/maintenance. For example, the client application may be "a rules engine" that runs within a device at the edge of a network, but which needs to call back to a central API to fetch "the appropriate rules for that specific device" that will be executed on the edge/fog device. In other words, there is need to load some base rules from a centralized Resource API. The rules that are supplied may be different depending on the location in the network where the device resides. The device itself could just be "bare metal" for a client application, which is separate from the normal operation of the device. By using both device identity to validate the device and client application identity (in addition to device identity) to determine the scope of permissions to be granted to the client application, these techniques provide a much more granular authorization flow than heretofore known.

To summarize, an authorization flow is provided in which a resource owner grant type of an oAuth v2 request would have two identities within the access-token request that the client application sends. These identities would be sent to the resource/API proxy for authorization check, prior to the resource API execution. The identities are (1) a client application identifier for the client application, which is useful in API call quotas, controls and versioning of the API; and (2) an identifier of the device itself that is unique, secure and based on the ability of the device to prove itself by digitally signing a block of text that a device identity validation server can check an approve/reject authentication. Thus, the device identifier is used for authentication and the device identifier and client application identifier together are used for authorization, assuming authentication is successful.

These techniques eliminate the misuse of a device impersonating "a human for scope and permissions" and add a deeper granularity to the authorization of the unique device, all while keeping the standards based backend Resource API(s) leveraging oAuth v2. Thus, these techniques do not require any major rewriting of the externalized APIs themselves, and only a minor addition to add a device identity validation server to the backend authorization process is needed.

Moreover, these techniques do not involve a browser and are well-suited for machine-to-machine communication. The client application interrogates the device in real-time, which means the client application is on the device. This makes the client application more trusted.

To reiterate, a mechanism is presented herein for both authenticating and authorizing a device and application access to hosted APIs without tying the device or application to a user identity. This provides the capability for businesses to authorize application access to services, irrespective of being connected to a user's account. This is accomplished by making slight modifications to the oAuth v2 standard, the result of which provides for a capability whereby companies can validate entitlement of a device (and application on the device) for access to services (such as a software upgrade), without needing that device or application to be tied to a user's account.

Devices (and the many independent applications which run on top of them) are able to access API resources and not just authenticate, but receive authorization for a given API access, without leveraging any user identity/credential. Additionally, this solution uses a modified oAuth v2 implementation that is widely available and scalable. This is useful for any application software company, where the application/device itself needs to be identified and authenticated/authorized without human intervention.

More generally, techniques presented herein solve a problem unique to authentication/authorization operations in networking environments by providing technology that can securely authorize access by devices to certain resources/ APIs using a device identity rather than a user identity.

In one form, a method is provided comprising: at a device having a secure device identity module: a client application of the device querying the secure device identity module to obtain a device identifier of the device and a signed string generated by the security device identity module using a private key unique to the device; and sending to an authorization server a request containing the device identifier and the signed string; at the authorization server: depending on an authentication result obtained from authenticating the device based on the device identifier, sending to the client application on the device an access token that enables the client application to access a resource.

In another form, a method is provided comprising: at a device having a secure device identity module: a client application of the device querying the secure device identity module to obtain a device identifier of the device and a signed string generated by the security device identity module using a private key unique to the device; and sending to an authorization server a request containing the device identifier and the signed string.

In still another form, an apparatus is provided comprising: a processor; a network interface unit configured to enable communications over a network; a memory storing instructions for a client application; and a secure device identity module that maintains a device identifier and is configured to generate a signed string using a private key; wherein the processor is configured to execute the instructions for the client application so as to: query the secure device identity module to obtain the device identifier and the signed string; generate a request containing the device identifier and the signed string; and cause the request to be sent to an authorization server.

In yet another form, one or more non-transitory computer readable storage media are provided, and wherein the computer readable storage media is encoded with instructions, that when executed by a processing system (e.g., a processor), cause the processor to execute instructions for a client application running on a device so as to: query a secure device identity module of the device, the secure device identity module maintaining a device identifier and configured to generate a signed string using a private key, to obtain the device identifier and the signed string; generate a request containing the device identifier and the signed string; and cause the request to be sent to an authorization server.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a device having a secure device identity module:
        a client application of the device querying the secure device identity module to obtain a device identifier of the device and a signed string generated by the security device identity module using a private key unique to the device; and
        sending to an authorization server a request containing the device identifier, the signed string, and a device domain;
    at the authorization server:
        sending the device identifier to a particular device identity validation server according to the device domain identified in the request; and
        depending on an authentication result obtained from authenticating the device based on the device identifier, sending to the client application on the device an access token that enables the client application to access a resource.

2. The method of claim 1, wherein the device identifier is an IEEE 802.1AR Subject.SerialNumber and the signed string is generated from cryptographically signing the Subject.SerialNumber with the private key.

3. The method of claim 1, wherein sending the request comprises transmitting a Hypertext Transfer Protocol Secure (HTTPS) POST with a POST payload indicating the device identifier and the signed string.

4. The method of claim 2, wherein the HTTPS POST is transmitted in accordance with an authorization procedure compliant with the oAuth 2.0 standard.

5. The method of claim 2, wherein the HTTPS POST is a Resource Owner Password Grant flow format grant_type=password & username, where username is based on the Subject.SerialNumber, and the password comprises at least the signed string.

6. The method of claim 2, wherein the request further includes a client application identifier as an authorization HTTPS header.

7. The method of claim 1, wherein the request further includes a nonce for protection against a replay attack.

8. The method of claim 1, further comprising, at the authorization server:
    determining a scope of authorization permissions based on the device identifier and a client application identifier contained in the request; and
    generating the access token based on the scope of authorization permissions.

9. The method of claim 1, wherein the request is of a format: grant_type=password & username=<IDevID.SubectSerialNumber@DeviceDomain>& password=<a signed block or string of text (signed by the private key of the device)>.

10. A method comprising:
    at a device having a secure device identity module:
        a client application of the device querying the secure device identity module to obtain a device identifier of the device and a signed string generated by the security device identity module using a private key unique to the device;
        sending to an authorization server a request containing the device identifier, the signed string, and a device domain, the device domain enabling the authorization server to identify a particular device identity validation server to which to send the request for validating an identity of the apparatus with the device identifier; and
        if the device identifier is validated, receiving, from the authorization server, an access token that enables the client application to access a resource.

11. The method of claim 10, wherein the device identifier is an IEEE 802.1AR Subject.SerialNumber and the signed string is generated from cryptographically signing the Subject.SerialNumber with the private key.

12. The method of claim 11, wherein sending the request comprises transmitting a Hypertext Transfer Protocol Secure (HTTPS) POST with a POST payload indicating the device identifier and the signed string.

13. The method of claim 12, wherein the request further includes a client application identifier as an authorization HTTPS header.

14. The method of claim 13, wherein the access token indicates a scope of authorization permissions determined based on the device identifier and the client application identifier.

15. An apparatus comprising:
a processor;
a network interface unit configured to enable communications over a network;
a memory storing instructions for a client application; and
a secure device identity module that maintains a device identifier and is configured to generate a signed string using a private key;
wherein the processor is configured to execute the instructions for the client application so as to:
query the secure device identity module to obtain the device identifier and the signed string;
generate a request containing the device identifier, the signed string, and a device domain, the device domain enabling the authorization server to identify a particular device identity validation server to which to send the request for validating an identity of the apparatus with the device identifier;
cause the request to be sent to an authorization server; and
if the device identifier is validated, receive, from the authorization server, an access token that enables the client application to access a resource.

16. The apparatus of claim 15, wherein the secure device identity module is implemented in hardware or software.

17. The apparatus of claim 15, wherein the device identifier is an IEEE 802.1AR Subject.SerialNumber and the signed string is generated from cryptographically signing the Subject.SerialNumber with the private key.

18. The apparatus of claim 17, wherein the processor is configured to cause the request to be sent as a Hypertext Transfer Protocol Secure (HTTPS) POST with a POST payload indicating the device identifier and the signed string.

19. The apparatus of claim 15, wherein the access token indicates a scope of authorization permissions determined based on the device identifier and the client application identifier.

20. The apparatus of claim 17, wherein the HTTPS POST is a Resource Owner Password Grant flow format grant_type=password & username, where username is based on the Subject.SerialNumber, and the password comprises at least the signed string.

21. The apparatus of claim 15, wherein the request is of a format: grant_type=password & username=<IDevID.SubectSerialNumber@DeviceDomain> & password=<a signed block or string of text (signed by the private key of the device)>.

* * * * *